United States Patent [19]
Millhollin

[11] Patent Number: 5,205,399
[45] Date of Patent: Apr. 27, 1993

[54] CONVEYOR BELT RETURN TRAINING DEVICE

[76] Inventor: Billy B. Millhollin, P.O. Box 549, Forsyth, Mont. 59327

[21] Appl. No.: 804,081

[22] Filed: Dec. 6, 1991

[51] Int. Cl.$^5$ ............................................. B65G 39/16
[52] U.S. Cl. ..................................................... 198/840
[58] Field of Search ................ 198/806, 807, 840, 842

[56] References Cited

U.S. PATENT DOCUMENTS

| | | | |
|---|---|---|---|
| 2,725,757 | 12/1955 | Murphy | 198/806 |
| 3,225,902 | 12/1965 | Roinestad | 198/842 |
| 4,506,782 | 3/1985 | Jeanneret et al. | 198/806 |

FOREIGN PATENT DOCUMENTS 1052453 11/1983 U.S.S.R. ............................... 198/807

Primary Examiner—Joseph E. Valenza
Attorney, Agent, or Firm—Richard C. Conover

[57] ABSTRACT

A return trainer for keeping a conveyor belt centered along the center line of normal travel path including a frame having a pair of side walls positioned adjacent to opposite edges of the conveyor belt. A first pair of parallel idler rollers are mounted between the side walls which rollers are positioned above and below a conveyor belt. A second pair of parallel idler rollers located downstream from the first pair of idler rollers are also mounted between the side walls on opposite sides of the conveyor belt. A pair of guide rollers are mounted on axles held by the frame intermediate the first and second set of idler rollers. The axles for these guide rollers extend in a generally vertical direction and each roller is positioned at an opposite edge of the conveyor belt. The guide rollers thus provide structure to prevent the conveyor belt from moving laterally away from the direction of travel.

6 Claims, 1 Drawing Sheet

CONVEYOR BELT RETURN TRAINING DEVICE

BACKGROUND OF THE INVENTION

This invention relates to an improved return trainer for recentering conveyor belts moving in a direction of travel.

Conveyor belts are used to convey a variety of materials such as ore, some of which are quite heavy and difficult to load evenly on a belt. When the material on the belt is not centered on the belt, the uneven loading causes the belt to shift laterally to one side or the other of supporting rollers necessitating frequent adjustments and more or less constant attention by the operators.

There are other factors making it difficult to maintain an alignment of the conveyor belt on the supporting rollers such as the stretching or warping of the belt due to temperature changes or wetting or the build up or uneven wear of the supporting rollers. In a typical installation, a conveyor system for handling ore may be one-half mile long and will have the endless belt approximately one mile long. The cost of these belts alone are very expensive. Should the belt be laterally displaced while it is running and come into contact with the support member, it will rapidly be worn and if not repaired the belt will deteriorate. It is very expensive to repair such belts because of the size and weight of the belt and it is imperative that belt wear be minimized.

To correct the problem, a number of devices have been used to sense the lateral drift of the conveyor belt so as to actuate some mechanism which will recenter the conveyor belt along its normal travel path. For example U. S. Pat. No. 2,751,067 to Nicholson shows a pair of idler wheels which are mounted on axles at the edge of the travelling belt which axles are oriented in a direction perpendicular to the direction of belt travel. If the traveling belt moves laterally, the idler wheels move the belt to a centered position on the support roller.

Another type of training device is shown in U.S. Pat. No. 3,303,924 to Hartzell Jr. With this arrangement, two (2) idler wheels are mounted on axles which are at an angle to the axle of the support roller but are in approximately the same vertical plane. Guide rollers are mounted at the edges of the idler rollers and when the belt touches the guide rollers, the idler roller swivels on the support member urging the belt back to its normal position.

Another type of device is shown in U.S. Pat. No. 3,913,729 to Andrews which shows a pair of idler rollers mounted at the opposite edges of the travelling belt. As the belt edge engages one of the rollers, the support roller is pivoted to urge the belt back to its normal position.

Other devices have used a pivotal framework to recenter the conveyor belt. The pivotal framework pivots about a vertical axis with the framework extending downstream in the direction of the conveyor belt travel. These devices have rollers for engaging the edges of the conveyor belt at locations that are downstream from the pivotal axis of the framework. As the framework pivots about the pivotal axis, the streaming motion of the conveyor belt across the pivoted support roller recenters the conveyor belt. An example of this type of device is shown in U.S. Pat. No. 4,506,782 to Jenneret et al.

All of these approaches to the problem of aligning a travelling conveyor belt utilize friction between the belt and the trainer to move the belt in the desired direction. All of these approaches will not do the job when there is little friction between the belt and the trainer due to moisture, ice or snow. Under these circumstances, the belt may merely flip up over the guide rollers located at the edge of the travelling conveyor belt causing the devices to not operate in a normal manner.

From the above it can be seen that an improved belt training device is needed which can keep the belt centered along the center line in the direction of travel and prevent the belt from jumping off the training device whenever ice, moisture or other debris gets caught near the guide rollers.

SUMMARY OF INVENTION

The present invention relates to a return trainer for keeping a conveyor belt centered along the centerline of the normal travel path without allowing the belt to move laterally away from the path or jump away from the idler rollers.

The device includes a frame which is fixed relative to the ground, with the frame having a pair of sidewalls positioned adjacent to opposite edges of the conveyor belt. The sidewalls rotatably hold a first pair of parallel idler rollers which rollers are positioned above and below a conveyor belt on opposite sides with the rollers extending generally horizontally. The longitudinal axis of each of the rollers lies generally perpendicular to the direction of travel so that a belt moving by the rollers does not have a tendency to drift laterally across the rollers. Further downstream and along the path in the direction of travel, a second pair of parallel idler rollers extend between the sidewalls, again on opposite sides of the conveyor belt. The second pair of idler rollers also have the longitudinal axis of each roller lying generally perpendicular to the direction of travel. In addition, both the first and second pair of idler rollers have their individual rollers separated by approximately the thickness of the conveyor belt so that the conveyor belt moving between each pair will engage and turn all four of the rollers. With this structure, the device prevents the conveyor belt from jumping away from the rollers since the conveyor belt is moving between parallel rollers that are engaging opposite sides of the belt.

Intermediate the first and second pair of rollers, a pair of guide rollers are mounted on axles held by the frame. The axles extend in a generally vertical direction and each roller is positioned on opposite edges of the conveyor belt. The guide rollers thus provide a structure to prevent the conveyor belt from moving laterally away from the direction of travel and in effect act on a rigid belt formed by the belt travelling between the two sets of idler rollers.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
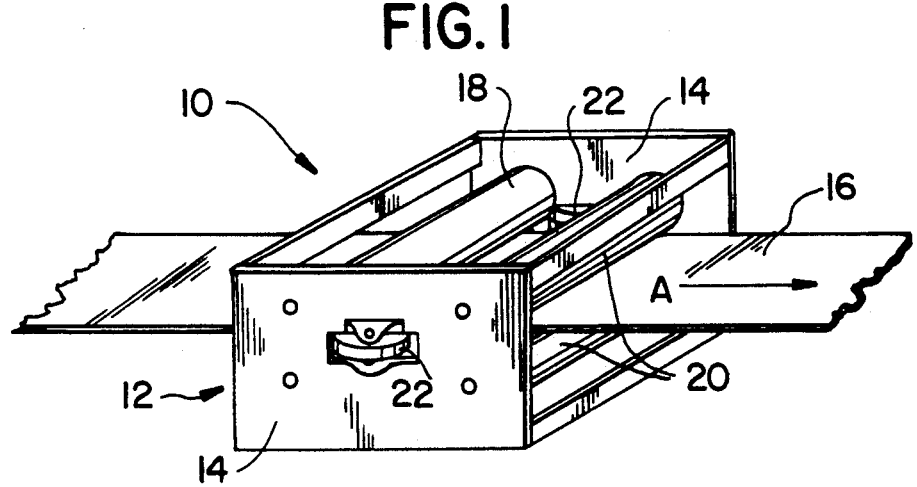
FIG. 1 is a perspective view of the training device of the present invention.
Figure 2:
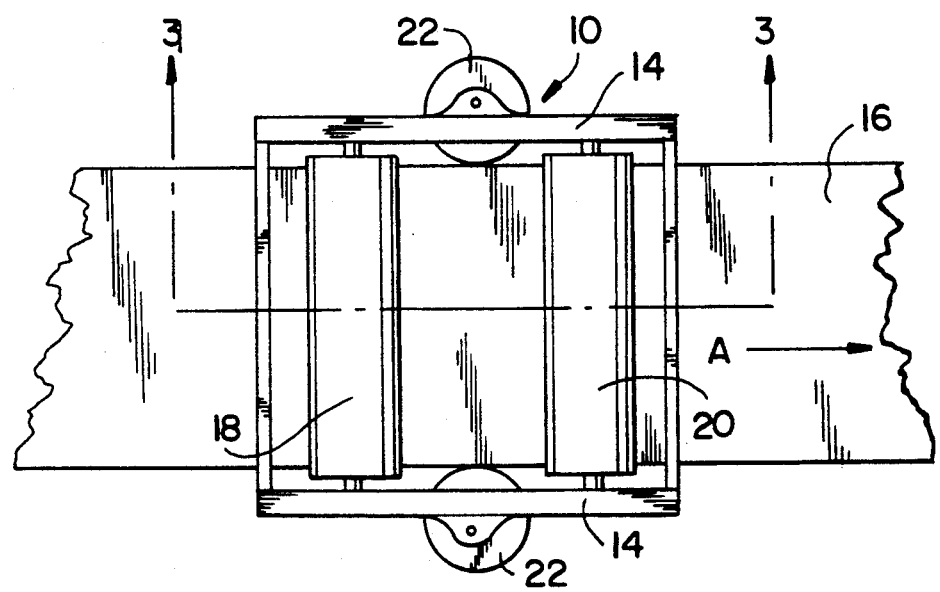
FIG. 2 is a plan view of the training device shown in FIG. 1.
Figure 3:
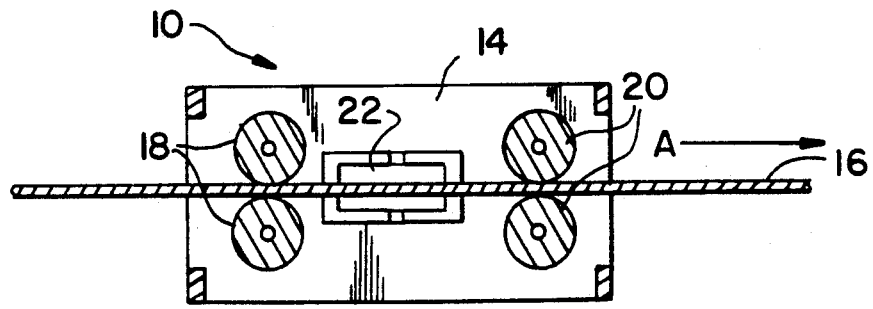
FIG. 3 is a cross-sectional view of the training device as seen from the line 3—3 in FIG. 2.

A preferred embodiment of the training device 10 is shown in FIG. 1. The training device 10 has a frame 12, fixed with relationship to the ground, which has sidewalls 14 positioned adjacent to opposite edges of conveyor belt 16. Conveyor belt 16 is moving in a direction of travel "A" as shown by the arrows in all three FIGS. A first pair of idler rollers 18 and 18a extend between the sidewalls 14 on axles 19 and 19a with the rollers engaging opposite sides of the conveyor belt. Rollers 18 and 18a are positioned so that their axles 19 and 19a extend generally perpendicular to the direction of travel "A" of the conveyor belt 16 By being positioned in this manner, the conveyor belt 16 will pass between the first parallel rollers 18 without having a tendency to curl.

Spaced apart from the first pair of idler rollers 18 and 18a in the direction of travel is a second set of idler rollers 20 and 20a. The second pair of idler rollers 20 and 20a also extend on axles 21 and 21a between the sidewalls 14 with the rollers engaging opposite sides of the conveyor belt 16. By connecting the axles 21 and 21a to the sidewalls 14, the first and second parallel rollers can be held in position by fixed frame 12. Rollers 20 and 20a again are positioned so that their longitudinal axles 21 and 21a extend generally perpendicular to the direction of travel "A" of the conveyor belt 16. This structure effectively causes the flexible conveyor belt 16 to form a "rigid plate" between the rollers 18, 18a and 20, 20a and prevents the conveyor belt from curling between the two sets of idler rollers.

Intermediate the first pair of idler rollers 18, 18a and the second pair of idler rollers 20, 20a, a pair of guide rollers 22 and 22a are mounted to frame 12 to engage opposite edges of conveyor belt 16. The guide rollers 22 and 22a have their axles oriented generally perpendicular to the direction of travel "A". In a preferred embodiment, the axles of the guide rollers 22 are positioned generally perpendicular to the axles of the idler rollers 18, 18a and 20, 20a. Guide rollers 22 and 22a by engaging opposite edges of conveyor belt 16, guide the conveyor belt in a properly aligned direction. Guide rollers 22 and 22a act on the rigid belt position of belt 16 between the two idler roller sets 18, 18a and 20, 20a. Moisture or ice will not prevent guide rollers 22 and 22a from effectively guiding belt 16 along its normal path.

In operation, the training device 10 is placed for guiding the belt 16 on the return portion of travel. The belt is positioned between idler rollers 18 and 18a and also 20 and 20a. The guide rollers 22 and 22a are positioned along opposite edges of belt 16. When conveyor belt 16 is activated and begins moving, idler rollers 18 and 18a will either dislodge ice and other debris on belt 16 or will crush the debris as it passes through rollers 18 and 18a. The belt 16 passing between idler rollers 18, and 18a and 20, and 20a present rigid edges to guide rollers 22 and 22a. The guide rollers 22 and 22a guide the belt on its normal path.

It should be understood that the inventor contemplates that other low friction devices such as sliders could be substituted for some or all of the idler rollers 18 and 18a, 20 and 20a and also the guide rollers 22 and 22a.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A training device for guiding a continuous belt having opposite sides and edges defining a belt width in between and moving in a direction of travel, the device comprising:
   a frame having opposite sidewalls each positioned adjacent to an opposite edge of the belt;
   a first pair of elongate low friction devices fixedly attached between the widewalls, the pair of low friction devices positioned one above the other and further positioned to engage opposite sides of the belt with each device having a respective longitudinal axis positioned generally perpendicular to the direction of travel and in a generally horizontal direction and each device having a belt engaging surface which extends continuously and completely across the width of the belt;
   a second pair of elongate low friction devices spaced apart downstream from the first pair of low friction devices in the direction of travel and fixedly attached between the sidewalls; the second pair of low friction devices positioned one above the other and further positioned to engage opposite sides of the belt with each device having a respective longitudinal axis positioned generally perpendicular to the direction of travel and in a generally horizontal direction and each device having a belt engaging surface which extends continuously and completely across the width of the belt;
   a pair of low friction guide devices positioned intermediate the first and second pair of low friction devices and connected to the frame so as to engage opposite edges of the belt;
   the pair of low friction guide devices each having a longitudinal axis extending generally perpendicular to the direction of travel and in a generally vertical direction.

2. A training device according to claim 1 wherein the first pair of low friction devices are spaced apart approximately the thickness of the conveyor belt.

3. A training device according to claim 2 wherein the second pair of low friction devices are spaced apart approximately the thickness of the conveyor belt.

4. A training device for guiding a continuous belt having opposite sides and edges defining a belt width in between and moving in a direction of travel, the device comprising:
   a frame having opposite sidewalls each positioned adjacent to an opposite edge of the belt;
   a first pair of elongate idler rollers rotatably held on axles fixedly attached to and extending between the sidewalls, the pair of idler rollers positioned with one roller above the other and further positioned to engage opposite sides of the belt with each roller having a respective axle positioned generally perpendicular to the direction of travel and in a generally horizontal direction and with each roller extending continuously and completely across the width of the belt;
   a second pair of elongate idler rollers spaced apart downstream from the first pair of rollers in the direction of travel and rotatably held on axles mounted between the sidewalls; the second pair of idler rollers positioned with one roller above the other and further positioned to engage opposite sides of the belt with each roller having a respective axle positioned generally perpendicular to the direction of travel and in a generally horizontal direction and with each roller extending continuously and completely across the width of the belt;

a pair of guide rollers positioned intermediate the first and second pair of idler rollers and connected to the frame so as to engage opposite edges of the belt; the pair of guide rollers each having an axle extending generally perpendicular to the direction of travel and in a generally vertical direction.

5. A training device according to claim 1 wherein the first pair of parallel rollers are spaced apart approximately the thickness of the conveyor belt.

6. A training device according to claim 2 wherein the second pair of parallel are spaced apart approximately the thickness of the conveyor belt.

* * * * *